Nov. 10, 1970 R. K. FLOSER ET AL 3,539,949
STACKED PRINTED CAPACITOR DELAY LINE
Filed April 3, 1968

United States Patent Office 3,539,949

Patented Nov. 10, 1970

3,539,949

STACKED PRINTED CAPACITOR DELAY LINE

Ronald K. Floser, North Adams, Mass., and John W. Guetersloh, Hamburg, N.Y., assignors to Sprague Electric Company, North Adams, Mass., a corporation of Massachusetts Filed Apr. 3, 1968, Ser. No. 718,525
Int. Cl. H03h 7/32; H01g 3/07
U.S. Cl. 333—29 4 Claims

ABSTRACT OF THE DISCLOSURE

A delay line having stacked printed mica capacitors connected to inductors is characterized by small size achieved by lamination of the capacitors, and improved interconnection means between capacitors and inductors. The capacitors are laminated using a bonding and insulating agent which preserves the electrical and mechanical properties of the capacitor. Capacitor-to-inductor interconnection is achieved by means of a lead frame whose inner terminals correspond to conductive areas on the capacitor surfaces and whose outer terminals correspond to inductor connection points. These terminals are secured in a single and/or unified operation.

BACKGROUND OF THE INVENTION

Delay lines have been included in the trend of miniaturization of electrical components stimulated primarily by the use of printed capacitors. These capacitors are generally formed by deposition of a conductive element such as silver onto the surface of a thin dielectric sheet. A pattern of individual conductive segments is deposited on one surface and a common conductive ground pattern is deposited on the other surface, resulting in the formation of individual capacitor segments. These segments may be adjusted, if required, to obtain the exact capacitance desired, and are then connected to an appropriate inductance. Mica is favored as the dielectric for many applications because mica can be obtained as very thin sheets, provides high Q's, has a low power factor, and provides a good surface for deposition of conductive patterns by silk-screening, evaporating or other preferred deposition method.

Certain limitations presently exist in the art. In applications where high capacitance values requires the stacking of two or more capacitor sheets, the sheets have heretofore been held together by some sort of clamping means. These clamping means, requiring the use of some degree of pressure, can cause damage to the dielectric, especially mica, or the deposited conductor. Some methods of insulation must also be provided, usually an insulating pad placed between the capacitors. Finally, the stacked sheets present wiring problems since each capacitive segment must be connected to a corresponding inductive segment resulting in a multiplicity of connection operations.

SUMMARY OF THE INVENTION

The present invention is a delay line utilizing printed capacitors with unique wiring means. Multiple capacitors are stacked by a lamination process which uses a resin-coated film as the bonding agent. Wiring means which are attached to the capacitors and connected to the inductive means result in simplified wiring methods. The wiring means can be attached to the capacitors by a soldering operation using the lamination means already required for the stacking process. The wiring itself is greatly simplified since it requires only one connection from capacitive segments on opposing stacked sheets to the corresponding inductive section. In an alternate embodiment, this last connection is designed to exactly align itself with the inductor connection point.

It is seen from the foregoing that, by stacking a plurality of capacitors, a broad range of capacitances can be achieved without sacrificing the inherent advantages of the thin printed capacitive sheets and without using possibly destructive clamping methods. The bonding agents are chosen both for their bonding properties and for their good insulation and electrical properties.

It is also seen from the foregoing that, given a known inductance terminal configuration, capacitor assemblies comprising stacked capacitor pairs, with connection means attached thereto, can be mass produced, whereby all that remains is to connect to the inductance terminal means in one operative step. This concept, besides leading to economy in assembly operation, would simplify inventory problems.

BRIEF DESCRIPTION OF THE DRAWINGS

A further understanding can be achieved from a study of the following description and drawings wherein.

DESCRIPTION OF THE PREFERRED EMBODIMENT

Figures 1, 2, 3, 4, 5:
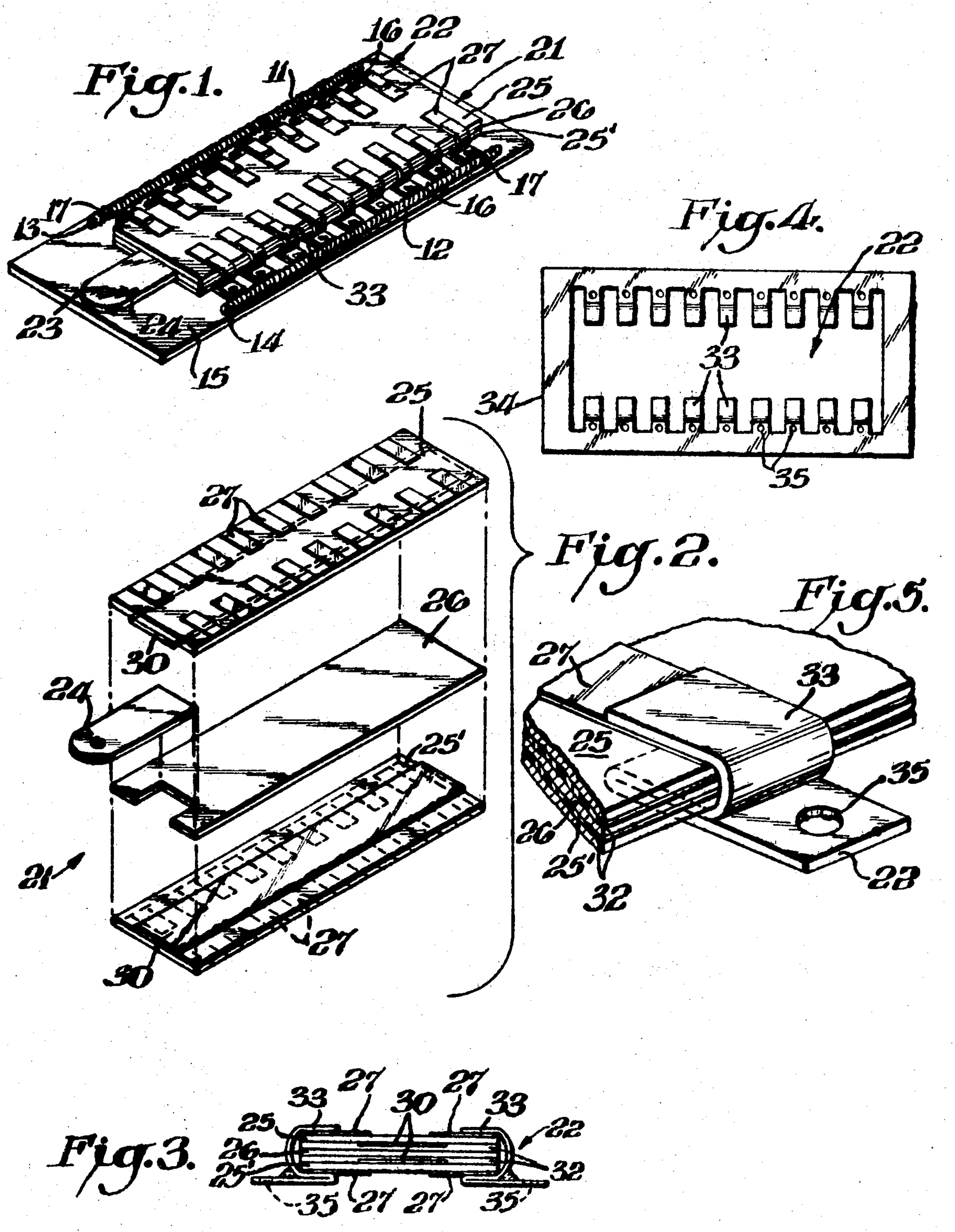
FIG. 1 is a schematic representation of the invention.
FIG. 2 is an exploded view of the capacitor assembly excepting the lead frame.
FIG. 3 is a cross-sectional view of the capacitor assembly with lead frame attached.
FIG. 4 shows the terminal lead frame prior to attachment.
FIG. 5 shows, in detail, construction and mounting of a single terminal.

A delay line consists essentially of a series of inductances and capacitances which, when properly connected, will produce a time delay between the input and the output terminals. FIG. 1 shows an embodiment of the invention wherein a coil, tapped at individual points to form individual inductive sections, is connected to a capacitor assembly. The capacitor assembly comprises a pair of silvered mica capacitor sheets laminated together. A lead frame having separate terminals is attached to conductive areas on the outside opposing surfaces of the sheets. The terminals have holes in one end designed to fit over the terminal posts connected to the inductor thereby making the capacitor-inductor connection.

Referring to FIG. 1, a more exact description of the embodiment is provided below. Inductance coils 11 and 12 are mounted on any convenient mounting means such as rods 13 and 14 which, in turn, are set in base 15 in any convenient manner. The coils have a number of taps 16 connected to terminal posts 17. The taps 16 can be spaced equally, if preferred, or varied to make a flexible section of delay. The coils 11 and 12 are thereby divided into a plurality of sections of selected inductance. Capacitor assembly 21 is connected to the inductor terminals 17 by terminal lead frame 22 and to ground terminal 23 by conductive tab 24. Capacitor assembly 21 is shown in detail in FIGS. 2 and 3.

FIG. 2 shows an exploded view of the assembly 21, expecting frame 22. Mica sheets 25 and 25' are separated by polyimide film 26. Each mica sheet has silvered deposits on both surfaces. The silver can be deposited by silk screening, an evaporating process or the like. One surface has a plurality of separated silver segments 27 while the other surface has a silver ground strip 30 which is common to segments 27. The two silvered surfaces act as plates in the formation of a plurality of individual capacitors on each sheet. Each of these capacitors is adjusted to a desired capacitance by any preferred method (e.g. reducing the area of a segment while testing with an appropriate capacitive section until a desired value of capacitance is achieved).

The sheets are laminated in the following manner. Referring to FIGS. 2 and 3, polyimide film 26 is cut to the size of the mica sheets 25, 25′ and an additional piece is cut out from one end to accommodate ground tab 24. Tab 24 can be a piece of flat tinned copper or other conductive element. Both surfaces of film 26 are coated with fluoro-carbon resin (32, FIG. 3) a bonding agent. The coated film with ground tab 24 inserted, is sandwiched between the two mica sheets and the assembly thus formed is placed between the two flat metal surfaces and heated under pressure causing the film to "flow" resulting in a laminated assembly. The heat also causes the tin coating on tab 24 to run, resulting in a soldering of the tab to the silvered areas 30.

After the assembly has cooled, silvered segments 27 are burnished and lead frame 22 is attached to the segments. The frame 22, shown in FIG. 4, comprises a plurality of terminals 33, whose inner ends are bent back as shown, supported by band 34 and, having apertures 35 at one end. The assembly 21 is then placed on the frame so that conductive segments 27 on the bottom surface each rest on a bent terminal 33. The end of the terminal 33 is then folded back over the upper surface of the assembly in the direction it originally lay thereby contacting conductive segment 27 opposite to the one resting on the other leg of the "*h*" thus formed. FIG. 5 illustrates a single "*h*" terminal 33 of frame 22 making the simultaneous contacts.

The frame 22 is soldered to the assembly by placing the assembly between two flat metal surfaces and applying heat and pressure. The heat should be at a temperature lower than that previously applied to prevent the lamination from separating.

When the assembly has cooled under pressure, band 34 can be cut away from the frame 22 and connections to terminal post 17 made by placing apertures 35 over their respective posts and making their attachment permanent by crimping, soldering or other means.

It is obvious that many changes and modifications may be made in the above-described details without departing from the spirit and scope of the invention. For example the dielectric could be ceramic or some other suitable material and any other deposited conductor could be substituted for the silver. Instead of interconnecting the coils and capacitive segments through a common terminal, direct connections to the inductor may be made. The head of the "*h*" configuration, instead of having a preformed connection aperture, could simply be a flexible lead for winding about a connection point. Instead of an "*h*" terminal configuration, a "*y*" configuration or the like could be used, the main requirement being that the terminal simultaneously contact a segment on each capacitor surface while making the connection to the appropriate inductance.

Finally, although a single capacitive pair is shown in the embodiment, multiple pairs could be formed and used as required.

What is claimed is:

1. A delay line comprising:

(a) a plurality of coil sections (b) a capacitor assembly including a plurality of physically identical printed capacitors, each capacitor including a dielectric sheet having a conductive grounding element deposited on one surface and separate conductive elements deposited on the opposite surface, said elements acting as plates with the dielectric therebetween to form individual capacitor segments, said printed capacitors being stacked so as to form pairs having adjoining ground surfaces;

a layer of melter polyimide film between the paired capacitors, said layers serving to bond together and insulate, each capacitor;

a conductive element inserted between each capacitor pair, one end of said element simultaneously contacting the grounding element on each capacitor, the other end extending at least to the capacitor assembly edge; and a lead frame having a plurality of terminals, said terminals making simultaneous contact with corresponding conductor segments on opposing surfaces of each capacitor pair and with an appropriate coil section.

2. A delay line as described in claim 1 wherein said terminals are of an "*h*" configuration, the legs of said "*h*" terminals being connected to corresponding conductor segments on opposing surfaces of each capacitor pair while the head of the terminals is connected to a coil section.

3. A delay line as described in claim 2 wherein the head of the "*h*" terminal has a preformed aperture and is of such predetermined length that connection to a coil section can be made by mounting a capacitor assembly in its required mounting location and positioning each "*h*" terminal head over a corresponding coil section connection point.

4. A delay line according to claim 2 wherein the dielectric sheets are composed of mica.

References Cited

UNITED STATES PATENTS

| | | | |
|---|---|---|---|
| 1,926,842 | 9/1933 | Dubilier | 29—25.42 |
| 2,847,648 | 8/1958 | Wendolkowski | 333—29 |
| 2,920,293 | 1/1960 | White | 333—29 |
| 2,206,720 | 7/1940 | Ducati | 317—261 |

FOREIGN PATENTS 595,657 12/1947 Great Britain.

OTHER REFERENCES

Windebank, R. W.: "Electroluminescent Display Presents Nanosecond Pulses," Electronics, 12-8-61, pp. 53-55, 333/29.

HERMAN KARL SAALBACH, Primary Examiner

W. H. PUNTER, Assistant Examiner

U.S. Cl. X.R.

317—256, 261